United States Patent [19]

Moorer et al.

[11] 4,204,877

[45] May 27, 1980

[54] CEMENT GRINDING AID AND SET RETARDER

[75] Inventors: Howard H. Moorer, Charleston; Charles M. Anderegg, Sullivan's Island, both of S.C.

[73] Assignee: Westvaco Corporation, New York, N.Y.

[21] Appl. No.: 3,356

[22] Filed: Jan. 15, 1979

[51] Int. Cl.$^2$ .................................................. C04B 7/35
[52] U.S. Cl. ........................................ 106/90; 106/102; 106/315
[58] Field of Search .................. 106/90, 102, 314, 315

[56] References Cited

U.S. PATENT DOCUMENTS

| | | | |
|---|---|---|---|
| 1,657,956 | 1/1928 | Chatelain | 106/90 |
| 1,998,667 | 4/1935 | Fritz et al. | 106/90 |
| 2,078,199 | 4/1937 | King | 106/315 |
| 3,615,785 | 10/1971 | Moorer et al. | 106/315 |

*Primary Examiner*—James Poer
*Attorney, Agent, or Firm*—Ernest B. Lipscomb, III; Terry B. McDaniel

[57] ABSTRACT

Additives for use as grinding aids and set retarders in the manufacture of hydraulic cement composed of polyglycerol, preferably a polyglycerol selected from the group of di-, tri-, and tetraglycerol and mixtures thereof, the additive being used either alone or in combination with at least one of a water-soluble glycol, a water-soluble hydroxy-alkyl amine, a water-soluble salt of a sulfonated lignin and a water-soluble salt of an aliphatic acid having no more than three carbon atoms, the hydraulic cement product of this addition and the method for making the cement product.

44 Claims, No Drawings

CEMENT GRINDING AID AND SET RETARDER

BACKGROUND OF THE INVENTION

(1) Field of the Invention

This invention relates to additives to hydraulic cements. In a particular aspect, it relates to additives for use in improving the grinding and set retarding characteristics of hydraulic cements, to the process for making these cements and to the resultant hydraulic cements containing these additives.

(2) Description of the Prior Art

Hydraulic cements are produced by calcining suitable raw materials, generally a mixture of calcareous and argillaceous materials, to produce a sintered "clinker." Of the hydraulic cements, portland types are by far the most important cements in terms of quantity produced. Portland cement represents a class of hydraulic cements and is comprised essentially of two calcium silicates and a lesser amount of calcium aluminate. These cements are produced by heating an intimate mixture of finely divided calcareous material (limestone) and argillaceous material (clay) to fusion to form a clinker. The clinker is ground with the addition of about 3% to 3.5% of gypsum, or some other form of calcium sulfite, to obtain desired setting qualities in the finished cement. Small amounts of other substances are sometimes added during grinding to impart special properties to the product.

Grinding of the clinker consumes substantial quantities of time and energy. It is common practice in the cement industry to employ grinding aids which increase the efficiency of the grinding operation thereby lowering the power required to grind a unit of cement and which decrease the plant investment either by increasing the through put of a given grinding mill or by reducing the size of mill needed to grind a given amount of cement. The addition of a grinding aid enables the mill to grind the clinker to a smaller size with less energy by prohibiting the buildup of a coating of finer material on the grinding media and walls of the mill by coating the nascent surfaces of the cement clinker. This coating of the cement clinker reduces the higher energy forces present on the nascent surface. Caution must be taken to prevent undue reduction of the surface forces because the cement becomes excessively fluid.

Known grinding aids include a water-soluble glycol and a water-soluble alkali metal salt of an aliphatic acid having no more than three carbons, which composition also acts as a pack set inhibitor (U.S. Pat. No. 3,615,785). U.S.S.R. Pat. No. 566,788 discloses the still residues of higher aliphatic acid salts and polyethylene glycol monoalkylphenyl ethers as additives to increase the effectiveness of pulverization of a cement clinker. Also, polypropylene glycol and/or polyglycol are disclosed as components of an additive composition containing triethanolamine for use as a cement grinding aid in South African Pat. No. 74 03,631.

It was only when the appreciable effect of cement fineness on the rate of its strength development was discovered, and when the fineness was increased that cases of flash setting became more frequent. The discovery that a small addition of gypsum can overcome this trouble was a considerable step forward in cement technology.

However, even with the inclusion of gypsum, an early or premature stiffening (false set) sometimes occurs, which can be troublesome if it occurs before the concrete is placed. False set in cement is evidenced in concrete by a significant loss of consistency shortly after mixing. After additional remixing, however, this concrete regains its original consistency.

Also, false set notwithstanding, in certain concrete applications a longer time is required for proper emplacement in the formation in the case of building construction concrete or, in masonry cement, a longer "board life" is needed, and a longer setting time than allowed by gypsum alone is necessary for an acceptable safety margin to do a satisfactory job.

Known set retarders for cement include: D-glycero-D-guloheptonolactone (U.S. Pat. No. 3,686,008); a salt of lignosulfonic acid combined with boric acid or a borate (U.S. Pat. No. 3,662,830); an alkanol-amino-lignosulfate-formaldehyde (U.S. Pat. No. 3,689,296); and, carbohydrates (mono-, di-, tri- and polysaccharides as well as derivatives thereof), polyhydroxy polycarboxylic compounds, lignosulfonic acid and salts thereof, water-soluble salts of boric acid, zinc oxide, and water-soluble silicone compounds and mixtures of these (U.S. Pat. No. 3,865,601).

U.S. Pat. No. 4,089,696 teaches the addition to a portland type cement mix of an acetic acid ester of glycerin to accelerate the rate of hardening of the mix and to increase the compressive strength of the mix when hardened.

It is the primary object of this invention to provide an additive for hydraulic cements which function as both grinding aids and set retarders.

It is a further object of this invention to provide a hydraulic cement containing an additive which functions both as a grinding aid and set retarder.

It is another object of this invention to provide a process for increasing the grinding efficiency of and retarding the hardening of hydraulic cement by the addition thereto of a small but effective amount of an additive without deleteriously affecting the desirable properties of the cement.

The object of set retardation may be achieved by adding the set retarder of the invention to the hydraulic cement either during grinding or in solution along with the water mixture of the ground cement.

SUMMARY OF THE INVENTION

It has been found that by intergrinding with hydraulic cement small quantities of an additive composed of a polyglycerol, preferably a polyglycerol selected from the group of di-, tri-, or tetraglycerol and mixtures thereof unexpectedly increases the grinding efficiency of the clinker and retards the hardening or setting of the concrete mix formed with the thus ground cement. The additive may be used alone or in combination with at least one of a water-soluble glycol, a water-soluble hydroxy-alkyl amine, a water-soluble salt of a sulfonated lignin and a water-soluble salt of an aliphatic acid having no more than three carbon atoms. The additive, alone or combined, is most conveniently and usually prepared as a solution in water and when interground with the clinker is mechanically dispersed over the nascent surfaces of the ground clinker thus reducing the surface forces of the cement to improve the grinding and reduce mill retention times. Although cement interground with the additive exhibits a reduced rate of hardening, set retardation may be achieved by incorporating the additive in solution along with the water mix.

DESCRIPTION OF THE PREFERRED EMBODIMENT

The practice of this invention comprises intergrinding with hydraulic cement small quantities of an additive composed of a polyglycerol, preferably a polyglycerol selected from the group of di-, tri-, and tetraglycerol and mixtures thereof, for the purpose of increasing the grinding efficiency and retarding the rate of hardening of the cement. Alternatively, set retardation may be achieved by incorporating the additive in solution along with the water in a concrete mix.

Only a small amount of additive need be used to achieve the desired results. Whether added to a hydraulic clinker or a hydraulic cement water mix at amounts below 0.01 percent based on the weight of the cement, the grinding efficiency and/or the set retardation are not appreciably improved; and at addition amounts above about 0.5 percent based on the weight of the cement, the improvements are not significant. An excessive amount of additive may prevent setting. Based upon an economically acceptable amount, the preferred range is from 0.01 to 0.05 percent of additive based on the weight of the cement. Although commercial grade polyglycerols are generally preferred, crude grades are sometimes used because of their economic benefits. By crude grades, it is meant, the less refined mixtures of polyglycerols obtained from commercial processes either from original production of the polyglycerols or reclaimed from other manufacturing processes.

Various other additive agents for hydraulic cement mixes have been used both alone and in conjunction with grinding aids and as set retarders, to achieve results of a similar character or to modify other properties of the hydraulic cements, as required by their particular use. The addition to the above additives of at least one of a hydroxy-alkyl-amine, a water-soluble glycol, a salt of a sulfonated lignin and the salt of an aliphatic acid having no more than three carbon atoms produces desirable additional improvements. The combination of one or several of these additive agents produces a variety of tailored grinding aids, the formulation to finally be determined by performance desired and economics.

Up to 90 percent of the total additive composition may consist of a water-soluble glycol, the preferable amount being from 10 percent to 50 percent. The water-soluble glycols of this invention include ethylene glycol, propylene glycols, polyethylene glycols, polypropylene glycols, diethylene glycol, triethylene glycol, dipropylene glycol and tripropylene glycol, combinations of these glycols, their derivatives, and reaction products formed by reacting ethylene and propylene oxide or polyethylene glycols and polypropylene glycols with active hydrogen base compounds (polyalcohols, polycarboxylic acids, polyamines, or polyphenols). Other glycols contemplated include neopentyl glycol, pentanediols, butanediols, and such unsaturated diols as butyne diols and butene diols. The preferred glycols are the mono- and polyglycols of ethylene and propylene and mixtures thereof because of their cost and water solubility.

The additives also contemplate the addition of up to 50 percent, based on the weight of the total additive composition, of a water-soluble salt of an aliphatic acid of no more than three carbons, i.e., acetic, formic, and propionic. From 10 percent to 40 percent by weight is preferred. Among examples of water-soluble salts which may be employed are salts of the alkali metals, alkaline earth metals, ammonia, aluminum, cobalt, and iron. Numerous other salts of aliphatic acids of no more than three carbons which are water-soluble will occur to those skilled in the art. The most commonly used and preferable salts are the sodium and potassium salts of acetic acid and mixtures thereof. The salts may be formed by reacting acetic acid and a member of the group consisting of potassium hydroxide, sodium hydroxide and mixtures thereof. High acetic acid concentrations with sodium tend to crystallize above 80 percent solids. For this reason potassium acetate is used when high solids concentrations are desired. U.S. Pat. No. 3,615,785 teaches that aliphatic acids and their water-soluble salts, when combined with a water-soluble glycol, are effective as grinding aids as well as pack set inhibitors.

In addition to an additive of a polyglycerol, a water-soluble glycol and the salt of an aliphatic acid having no more than three carbons, it is preferable to include other additive agents which further increase the grinding efficiency. One preferred additive agent is a water-soluble hydroxy-alkyl amine or a salt derivative thereof, the most effective of this class being triethanolamine, employed in an amount up to 75 percent based on the combined weight of the glycol and the amine, the preferable amount being from 10 percent to 50 percent by weight. It is preferable to use a commercial grade which consists mostly of triethanolamine together with smaller amounts of the primary and secondary amine. Other well known hydroxy-alkyl amines may also be successfully employed.

Another important class of additives are the water-soluble salts of sulfonated lignin and sulfonated lignin derivatives. These lignins are principally obtained as byproducts from sulfite pulping of woody materials. The waste liquors from such pulping contain large quantities of lignin and lignin products in conjunction with other materials. The sulfonated lignin additionally may be produced by reacting lignins obtained from alkali pulping, acid hydrolysis or other known recovery process with an inorganic sulfite, e.g., sodium sulfite, whereby sulfonate groups are added to the lignin. For use in this invention, up to 50 percent by weight of the total additive composition of any of the various water-soluble sulfonated lignins may be employed, the preferred range being from 10 percent to 30 percent. Where set retardation properties are desired, it is preferable to utilize sulfonated lignins which contain carbohydrate materials. Sulfonated lignins obtained from reaction of sulfites with lignin do not contain any appreciable amounts of these carbohydrates and consequently may be employed as is. The sulfonated lignins may be converted into water-soluble salts, and used as such, as disclosed in U.S. Pat. No. 2,141,570. The use of sulfonated lignins if added to improve grinding serves to entrain air in the cement and to reduce the water required to give proper flow of the concrete mix. Further, the low cost of these lignin salts makes a more economical product.

The inclusion of each additive agent either individually or in combination serves to increase the grinding efficiency while retarding set and retaining other desirable properties of cement when added to the grinding mill.

The term grinding aid describes an increase in production at constant product surface area or an increase in surface area at a constant production rate during the grinding of the clinker and gypsum in the finish mill.

The practice of this invention may clearly be seen in the following examples.

EXAMPLE 1

To evaluate the grinding aid effects of polyglycerol, a grinding trial was conducted on commercial equipment comparing polyglycerol and a formulation of polyglycerol, a water-soluble glycol and a defoamer with a commercially available cement grinding aid, Westvaco Corporation's REAX ® G-2. The polyglycerol tested was a crude glycerine bottoms product, primarily a mixture of di-, tri- and tetraglycerol and 20 percent water. The grind was conducted using a 5,000 horsepower, 2-compartment mill in closed circuit with a Raymond Separator. The mill was started at 4:00 a.m. on a portland Type I clinker using REAX ® G-2 as a "control" grinding aid in an amount of 0.016% based on the weight of the cement.

Cement samples taken during the run were identified as follows:

At 9:30 a.m., Control taken just before start of trail grind represented normal production with REAX ® G-2 at 0.016%, "control" or reference sample.

At 11:30 a.m., Sample A taken two hours after start of grind contained 0.016% of a formulation containing about 80% polyglycerol and about 20% of a water-soluble glycol.

At 12:30 p.m., Sample A was the same as the preceding Sample A, but taken three hours after start of trail grind and just before switching to straight polyglycerol.

At 1:50 p.m., Polyglycerol taken one hour and fifteen minutes after switching to straight polyglycerol contained 0.016% polyglycerol, based on the weight of the cement.

Evaluation results of these samples are presented in Table I.

TABLE I

| Test | Blaine (cm²/gm) | Air Entrainment (% by vol.) | Normal Consistency (% water requirement) | Vicat Set Time (min.) | Compressive Strengths 7 days (psi) | 28 days (psi) |
| --- | --- | --- | --- | --- | --- | --- |
| 9:30/Control | 3878 | 10.7 | 23.8 | 112 | 4583 | 6617 |
| 11:30/Sample A | 3811 | 8.8 | 23.7 | 129 | 4825 | 6733 |
| 12:30/Sample A | 3846 | 9.4 | 23.5 | 124 | 4675 | 7017 |
| 1:50/Polyglycerol | 3815 | 8.5 | 23.5 | 134 | 4917 | 7025 |

The uniformity of the Blaine results validated the remaining comparisons as well as the grinding rates. The air entrainment test showed a lower level of air entrainment than REAX ® G-2. There was a slight but noticeable decrease in water requirement and extension of setting time. The seven and twenty-eight day compressive strengths were equal to, or very slightly higher, for the polyglycerol grinds.

EXAMPLE 2

To determine the effectiveness of polyglycerol as a retarder when employed as a grinding aid, the polyglycerol employed in Example 1 was again interground with both portland Type I and portland Type II clinkers on the same equipment used in the previous example. Cement samples from each grind were tested for setting time on at least one of the following penetrometers: the Vicat Needle; the Gilmore Needle; and the Maruto Testing Machine. Roan Industry's RII ® 77 grinding aid was used as the standard.

The results of the set time tests are shown in Table II.

TABLE II

| | Dosage (%) | TYPE I Set Time in Minutes | | | |
| --- | --- | --- | --- | --- | --- |
| | | Vicat | Gilmore Initial | Final | Maruto Final |
| Standard | 0.0218 | 130 | 190 | 330 | 156 |
| Polyglycerol | 0.0196 | 170 | 230 | 360 | 179 |

| | Dosage (%) | TYPE II Set Time in Minutes Maruto Final |
| --- | --- | --- |
| Standard | 0.0218 | 183 |
| Polyglycerol | 0.0218 | 211 |
| Polyglycerol | 0.0327 | 245 |

EXAMPLE 3

In view of the distinct set retardation effect of polyglycerol when interground with the clinker, the polyglycerol was also tested as a retarder when added to the mixing water in already ground cement.

Various dosage levels of the polyglycerol of the previous examples, based on the weight of the cement, were added to the mixing water used in setting time tests of a portland Type I cement. The test procedure used was essentially ASTM C191 except that (1) pastes were not necessarily at normal consistency and (2) the Maruto Automatic Tester was used. The set retardation in the samples mixed with the polyglycerol was pronounced, as can be seen from the data in Table III.

TABLE III

| Tests | Blank | Polyglycerol 0.01% | 0.02% | 0.03% | 0.04% | 0.05% |
| --- | --- | --- | --- | --- | --- | --- |
| Mixing Water | 156 ml. | 156 ml. | 156 ml. | — | — | — |
| Setting Time | 160 min. | 165 min. | 195 min. | — | — | — |
| % of Blank | — | 103% | 122% | — | — | — |
| Mixing Water | 152 ml. | — | — | 152 ml. | 152 ml. | 152 ml. |
| Setting Time | 140 min. | — | — | 165 min. | 200 min. | 210 min. |
| % of Blank | — | — | — | 118% | 143% | 150% |

EXAMPLE 4

During a three-day period, five grinding aid formulations were run on a portland Type I cement using a commercial cement mill. Dilution water was added by rotometer into the feed line, so no pre-mixing for dilution was required. As in Example 1, REAX® G-2 was used as the control grinding aid. The five experimental grinding aid formulations were:

A-a 50% solution of a highly sulfonated lignin.

B-a 50% solution of a highly sulfonated lignin plus a defoamer.

C-a 60% solution of a 50:50 blend of a 50% solution of highly sulfonated lignin and the glycol of Example 1. Again, defoamer was added.

D-a 60% solution of a 50:50 blend of a 50% solution of highly sulfonated lignin and polyglycerol.

E-an 80% solution of a 50:50 blend of a mixture of 10% triethanolamine and 90% glycol and polyglycerol.

The following Table IV presents the data obtained. All additives were run at a dosage level of 0.02%, the normal usage of REAX® G-2.

TABLE IV

| Formulation | Run Time, Hours | Tons/ Hour | Air Content, % by Volume | Blaine Fineness, cm²/g |
|---|---|---|---|---|
| REAX® G-2 (control) | — | 52-55 | 8.2-9.2 | 3650-3850 |
| A | 2 | 55 | 10.5 | 3600 |
| B | 3.5 | 51 | 8.2 | 3740 |
| C | 2 | 54 | 8.0 | 3700 |
| D | 1 | 50 | 8.2 | 3577 |
| E | 4.5 | 55 | 8.0 | 3610 |

Only one of the formulations appeared to show an improvement over REAX® G-2; Formulation E showed the best grinding efficiency, 55 tons/hour. On the day Formulation E was run, the control was making 52 tons/hour when the test began. One hour after the testing stopped and the control was again put on the mill, production was 52 tons/hour. Formulation E's Blaine fineness and air content were comparable to the control. A difference of 1-2 tons per hour is significant on a 24 hours/day, 7 days/week grinding schedule.

EXAMPLE 5

For further assurance that polyglycerol performs suitably when employed in a formulation with known grinding aids in addition to a water-soluble glycol and triethanolamine, the following formulation was prepared and diluted 4:1 with water: 13.3% polyglycerol; 20% a water-soluble glycol; 22% triethanolamine; 22.7% acetic acid; 17.7% potassium hydroxide; and 0.3% sulfonated lignin. Pilot grinds were made in laboratory cement mills using the prepared formulation and a commercial cement grinding aid. A comparison of two indicators of product quality is shown in Table V.

TABLE V

| Grinding Aid | Commercial REAX® 77 | Test Formulation |
|---|---|---|
| Additive Dosage Level, % | 0.0166 | 0.0166 |
| Blaine Fineness after Grinding One Hour, cm²/g | 4955 | 5030 |
| Air Content, % by Volume | 7.8 | 7.7 |

While this invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. A hydraulic cement additive composition comprising a polyglycerol, from 10% to 50% by weight of the total additive composition of a water-soluble glycol, from 10% to 40% by weight of the total additive composition of a water-soluble salt of an aliphatic acid having no more than three carbons, from 10% to 50% by weight of a water-soluble hydroxyalkyl amine based on the combined weight of the glycol and the amine, and from 10% to 30% by weight of the total additive composition of a water-soluble salt of a sulfonated lignin.

2. The hydraulic cement additive of claim 1 wherein the polyglycerol is selected from the group consisting of di-, tri- and tetraglycerol and mixtures thereof.

3. The hydraulic cement additive of claim 1 wherein the water-soluble glycol is selected from the group consisting of monoethylene glycol, polyethylene glycols, monopropylene glycol, polypropylene glycols and mixtures thereof.

4. The hydraulic cement additive of claim 1 wherein the water-soluble salt of an aliphatic acid is selected from the group consisting of potassium acetate, sodium acetate and mixtures thereof.

5. The hydraulic cement additive of claim 1 or 4 wherein the water-soluble salt of an aliphatic acid is formed by reacting acetic acid and a member of the group consisting of potassium hydroxide, sodium hydroxide and mixtures thereof.

6. The hydraulic cement additive of claim 1 wherein the water-soluble hydroxy-alkyl amine is triethanolamine.

7. The hydraulic cement additive of claim 1 wherein the sulfonated lignin contains carbohydrate materials.

8. The hydraulic cement additive of claim 1 wherein the additive is in an aqueous solution.

9. A hydraulic cement composition containing as an essential ingredient from 0.01% to 0.5% based on the weight of the cement of an additive comprising a polyglycerol, from 0% to 90% by weight of the total additive being a water-soluble glycol, from 0% to 50% by weight of the total additive composition being a water-soluble salt of an aliphatic acid having no more than three carbons, from 0% to 75% by weight of a water-soluble hydroxy-alkyl amine based on the combined weight of the glycol and the amine, and from 0% to 50% by weight of the total additive composition of a water-soluble salt of a sulfonated lignin, wherein the polyglycerol comprises the additive in an amount equal to at least 0.01% based on the weight of the cement.

10. The hydraulic cement composition of claim 9 wherein the polyglycerol is selected from the group consisting of di-, tri- and tetraglycerol and mixtures thereof.

11. The hydraulic cement composition of claim 9 wherein the water-soluble glycol is selected from the group consisting of monoethylene glycol, polyethylene glycols, monopropylene glycol, polypropylene glycols and mixtures thereof.

12. The hydraulic cement composition of claim 9 or 11 wherein the water-soluble glycol is employed in an amount of from 10% to 50% by weight of the total additive composition.

13. The hydraulic cement composition of claim 9 wherein the water-soluble salt of an aliphatic acid is selected from the group consisting of potassium acetate, sodium acetate and mixtures thereof.

14. The hydraulic cement composition of claim 9 or 13 wherein the water-soluble salt of an aliphatic acid is formed by reacting acetic acid and a member of the group consisting of potassium hydroxide, sodium hydroxide and mixtures thereof.

15. The hydraulic cement composition of claim 9 or 13 wherein the water-soluble salt of an aliphatic acid is present in an amount from 10% to 40% by weight of the total additive composition.

16. The hydraulic cement composition of claim 9 wherein the water-soluble hydroxy-alkyl amine is triethanolamine.

17. The hydraulic cement composition of claim 9 or 16 wherein the water-soluble hydroxy-alkyl amine is present in an amount from 10% to 50% by weight based on the combined weight of the glycol and the amine.

18. The hydraulic cement composition of claim 9 wherein the sulfonated lignin contains carbohydrate materials.

19. The hydraulic cement composition of claim 9 or 18 wherein the water-soluble salt of a sulfonated lignin is present in an amount from 10% to 30% by weight of the total additive.

20. The hydraulic cement composition of claim 9 wherein the additive is in an aqueous solution.

21. The hydraulic cement composition of claim 9 wherein the composition contains 0.01% to 0.05% of the additive, based on the weight of the cement.

22. A process for increasing the grinding efficiency of a hydraulic cement and for retarding the set of the cement which comprises intergrinding with said cement from 0.01% to 0.5% by weight of the cement of an additive comprising a polyglycerol, from 0% to 90% by weight of the total additive composition of a water-soluble glycol, from 0% to 50% by weight of the total additive composition of a water-soluble salt of an aliphatic acid having no more than three carbons, from 0% to 75% by weight of a water-soluble hydroxy-alkyl amine based on the combined weight of the glycol and the amine, and from 0% to 50% by weight of the total additive composition of a water-soluble salt of a sulfonated lignin, wherein the polyglycerol comprises the additive in an amount equal to at least 0.01% based on the weight of the cement.

23. The process of claim 22 wherein the polyglycerol is selected from the group consisting of di-, tri- and tetraglycerol and mixtures thereof.

24. The process of claim 22 wherein the water-soluble glycol is selected from the group consisting of monoethylene glycol, polyethylene glycols, monopropylene glycol, polypropylene glycols and mixtures thereof.

25. The process of claim 22 or 24 wherein the water-soluble glycol is employed in an amount from 10% to 50% by weight of the total additive composition.

26. The process of claim 22 wherein the water-soluble salt of an aliphatic acid is selected from the group consisting of potassium acetate, sodium acetate and mixtures thereof.

27. The process of claim 22 or 26 wherein the water-soluble salt of an aliphatic acid is formed by reacting acetic acid and a member of the group consisting of potassium hydroxide, sodium hydroxide and mixtures thereof.

28. The process of claim 22 or 26 wherein the water-soluble salt of an aliphatic acid is present in an amount from 10% to 40% by weight of the total additive.

29. The process of claim 22 wherein the water-soluble hydroxy-alkyl amine is triethanolamine.

30. The process of claim 22 or 29 wherein the water-soluble hydroxy-alkyl amine is present in an amount from 10% to 50% by weight based on the combined weight of the glycol and the amine.

31. The process of claim 22 wherein the sulfonated lignin contains carbohydrate materials.

32. The process of claim 22 or 31 wherein the water-soluble salt of a sulfonated lignin is present in an amount from 10% to 30% by weight of the total additive.

33. The process of claim 22 wherein the additive is in an aqueous solution.

34. The process of claim 22 wherein from 0.01% to 0.05% of the additive, based on the weight of the cement, is interground with the cement.

35. A concrete mix comprising a hydraulic cement and from 0.01% to 0.5%, based on the weight of the cement, of a polyglycerol.

36. The mix of claim 35 wherein the hydraulic cement is Portland cement.

37. The mix of claim 35 or 36 wherein the polyglycerol is selected from the group consisting of di-, tri- and tetraglycerol and mixtures thereof.

38. The mix of claim 37 wherein the polyglycerol is employed in an amount from 0.01% to 0.05% based on the weight of the cement.

39. The mix of claim 35 wherein the polyglycerol is in an aqueous solution.

40. A process for retarding the set of a hydraulic cement which comprises adding to a concrete mix of the cement from 0.01% to 0.5% of a polyglycerol, based on the weight of the cement.

41. The process of claim 40 wherein the hydraulic cement is Portland cement.

42. The process of claim 40 or 41 wherein the polyglycerol is selected from the group consisting of di-, tri- and tetraglycerol and mixtures thereof.

43. The process of claim 42 wherein the polyglycerol is employed in an amount from 0.01% to 0.05% based on the weight of the cement.

44. The process of claim 40 wherein the polyglycerol is in an aqueous solution.

* * * * *